(12) United States Patent
Lin (10) Patent No.: US 8,353,503 B2
(45) Date of Patent: Jan. 15, 2013

(54) EDGE ALIGNMENT CONTROL APPARATUS FOR SHEET MATERIAL

(76) Inventor: Tzu-Che Lin, Taipei Hsien (TW)

( * ) Notice: Subject to any disclaimer, the term of this patent is extended or adjusted under 35 U.S.C. 154(b) by 754 days.

(21) Appl. No.: 12/579,013

(22) Filed: Oct. 14, 2009

(65) Prior Publication Data

US 2011/0084439 A1   Apr. 14, 2011

(51) Int. Cl.
*B23Q 3/00* (2006.01)
*B23Q 1/25* (2006.01)
*B65H 29/24* (2006.01)
*B65H 9/12* (2006.01)
*B65H 9/16* (2006.01)
*B65H 9/04* (2006.01)
*B65H 5/00* (2006.01)
*B65H 5/04* (2006.01)

(52) U.S. Cl. ............. 269/289 MR; 269/55; 269/298 R; 269/329; 414/936; 271/241; 271/249; 271/253; 271/254; 271/264; 271/275; 271/194

(58) Field of Classification Search ........... 269/289 MR, 269/298 R, 329, 55; 29/281.1; 414/936; 271/241, 249, 253, 254, 264, 275, 194
See application file for complete search history.

(56) References Cited

U.S. PATENT DOCUMENTS 5,934,626 A * 8/1999 Collins, Jr. ............... 248/132

* cited by examiner

*Primary Examiner* — Monica Carter
*Assistant Examiner* — Nirvana Deonauth
(74) *Attorney, Agent, or Firm* — Muncy, Geissler, Old & Lowe, PLLC (57) ABSTRACT

An edge alignment control apparatus for correcting vertical alignment of sheet members is disclosed to include two base units each having multiple first power drives controllable to reciprocate a respective horizontal reciprocating member, and adjustment units arranged between the base units, each adjustment unit having two holder blocks connected to the horizontal reciprocating members of the base units at one same elevation and movable by the respective horizontal reciprocating members horizontally, sheet-transfer rollers pivotally connected between the holder blocks, a bearing board connected between the holder blocks for receiving a sheet member from the sheet-transfer rollers and a suction hood suspending above the bearing board and defining with the bearing board a passage for the passing of a sheet member and controllable to suck up a sheet member from the bearing board for allowing adjustment of the position of the sheet member horizontally subject to the operation of the first power drive.

5 Claims, 8 Drawing Sheets

EDGE ALIGNMENT CONTROL APPARATUS FOR SHEET MATERIAL

BACKGROUND OF THE INVENTION

1. Field of the Invention

The present invention relates to corrugated paper board fabrication technology and more particularly, to an edge alignment control apparatus for sheet material that allows quick correction of vertical alignment of sheet members to be glued.

2. Description of the Related Art

Following the progress of time and the development of industry and business, product market competition is severe. In addition to cheap cost, quality control is one of the requisite factors to survive in the market. Manufacturers commonly utilize automatic production equipment to fabricate products instead of conventional machines, enhancing the productivity and improving the yield rate.

Following improvement of people's living standards and the rise of environmental protection consciousness, paper material is intensively used for packing or wrapping commercial products. Corrugated paper boards are intensively used for making cartons and boxes for the advantages of high strength and shock absorbing characteristics. Further, corrugated paper board facilitates printing. Using a carton or a box of a corrugated paper board for packing commercial products for storage and delivery can well protect the products against damage.

The fabrication of a corrugated paper board requires a series of processes, including paper receiving, pre-heating, corrugated paper forming, gluing, cooling, stamping, trimming, cutting and stacking. Regular corrugated paper boards may have a different number of layers, such as 3 ply, 5 ply, 7 ply or 10 ply. When bonding two paper sheet members with glue, the paper sheet members must be kept in perfect alignment as they are being delivered forwards at different elevations. If one of the paper sheet members is deviated from the course, the glued product will become defective. A defective paper board may be trimmed. However, this extra trimming process complicates the fabrication and increases the labor cost. Further, the reduced size of the trimmed paper board may not meet the requirement.

Therefore, it is desirable to provide a measure or apparatus that can control the alignment of paper sheet members to be glued.

SUMMARY OF THE INVENTION

The present invention has been accomplished under the circumstances in view. It is one object of the present invention to provide an edge alignment control apparatus for sheet material, which controls accurate alignment of sheet members to be glued.

To achieve this and other objects of the present invention, an edge alignment control apparatus for sheet material comprises two base units, and adjustment units arranged between the base units. Each base unit comprises multiple first power drives controllable to reciprocate a respective horizontal reciprocating member. Each adjustment unit comprises two holder blocks connected to the horizontal reciprocating members of the base units at one same elevation and movable by the respective horizontal reciprocating members horizontally, rollers pivotally connected between the holder blocks for transferring a sheet member, a bearing board connected between the holder blocks for receiving a sheet member from the rollers and a suction hood suspending above the bearing board and defining with the bearing board a passage for the passing of a sheet member and controllable to suck up a sheet member from the bearing board for allowing adjustment of the position of the sheet member horizontally subject to the operation of the first power drive. By means of operating the first power drives to reciprocate the respective reciprocating members, the position of the sheet member that is sucked up by the suction hood is relatively adjusted.

Further, second power drives are respectively mounted on the holder blocks of each adjustment unit and controllable to reciprocate respective reciprocating members that are respectively vertically connected to respective connectors at the suction hood of the respective adjustment unit. When the sheet member that is fed into the passage between the bearing board and suction hood of one adjustment unit is jammed in the passage, the operator can operate the second power drives to adjust the elevation of the suction hood, thereby eliminating the paper jam problem.

Further, multiple adjustment units can be arranged in an array between the two base units so that the front-sided adjustment unit and the rear-sided adjustment units can be separately adjusted, doubling the adjustable adjustment range.

DETAILED DESCRIPTION OF THE PREFERRED EMBODIMENT

Figure 1:
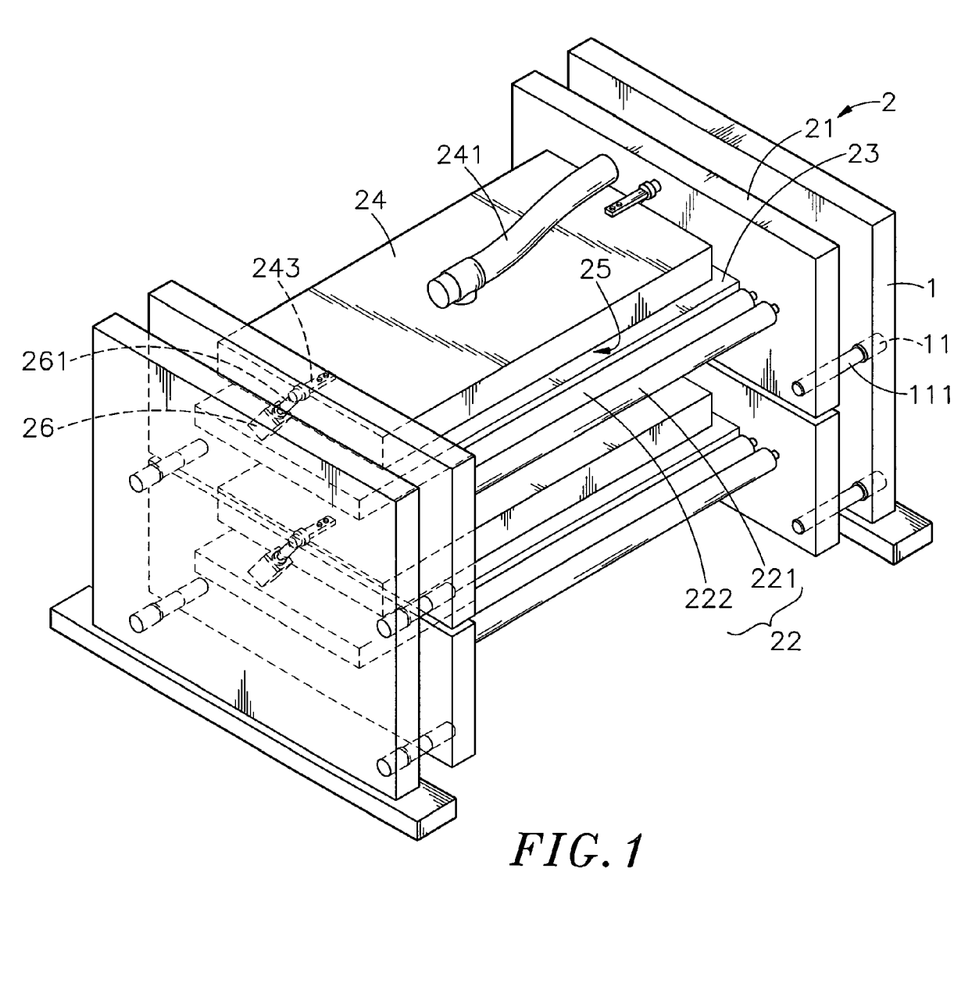
FIG. 1 is a perspective view of an edge alignment control apparatus for sheet material in accordance with the present invention.
Figure 2:
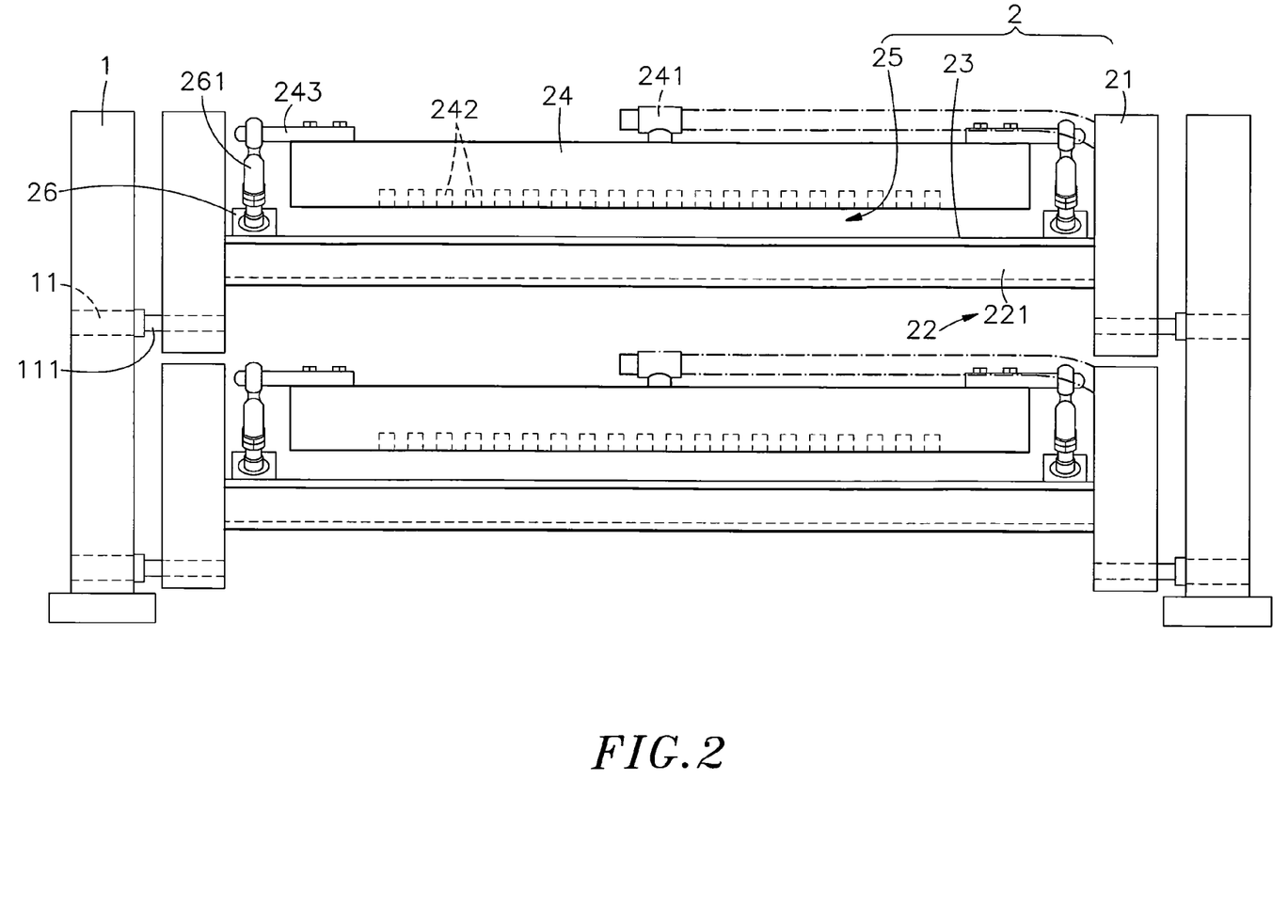
FIG. 2 is a schematic front view of the edge alignment control apparatus for sheet material in accordance with the present invention.

Referring to FIGS. 1 and 2, an edge alignment control apparatus for sheet material in accordance with the present invention is shown comprising two base units 1 arranged in parallel at two opposite lateral sides and a plurality of adjustment units 2 arranged at different elevations between the two base units 1.

Each base unit 1 comprises a plurality of first power drives 11 and controllable to reciprocate a respective horizontal reciprocating member 111.

Each adjustment unit 2 comprises two holder blocks 21 respectively connected to the horizontal reciprocating members 111 of the two base units 1 at one same elevation and movable by the respective horizontal reciprocating members 111, a conveying mechanism 22, which comprises a first roller 221 and a second roller 222 pivotally connected between the two holder blocks 21, a bearing board 23 connected between the two holder blocks 21 at one lateral side relative to the second roller 222 and opposite to the first roller 221, a suction hood 24, which has a plurality of suction holes 242 arranged at the bottom side thereof and facing the bearing board 23, an air pipe 241 disposed at the top side thereof and two connectors 243 located on two opposite lateral sides thereof, a passage 25 defined between the bearing board 23 and the suction hood 24 and two second power drives 26 that respectively mounted on the holder blocks 21 and controllable to reciprocate respective reciprocating members 261 that are respectively vertically connected to the connectors 243.

Figure 3:
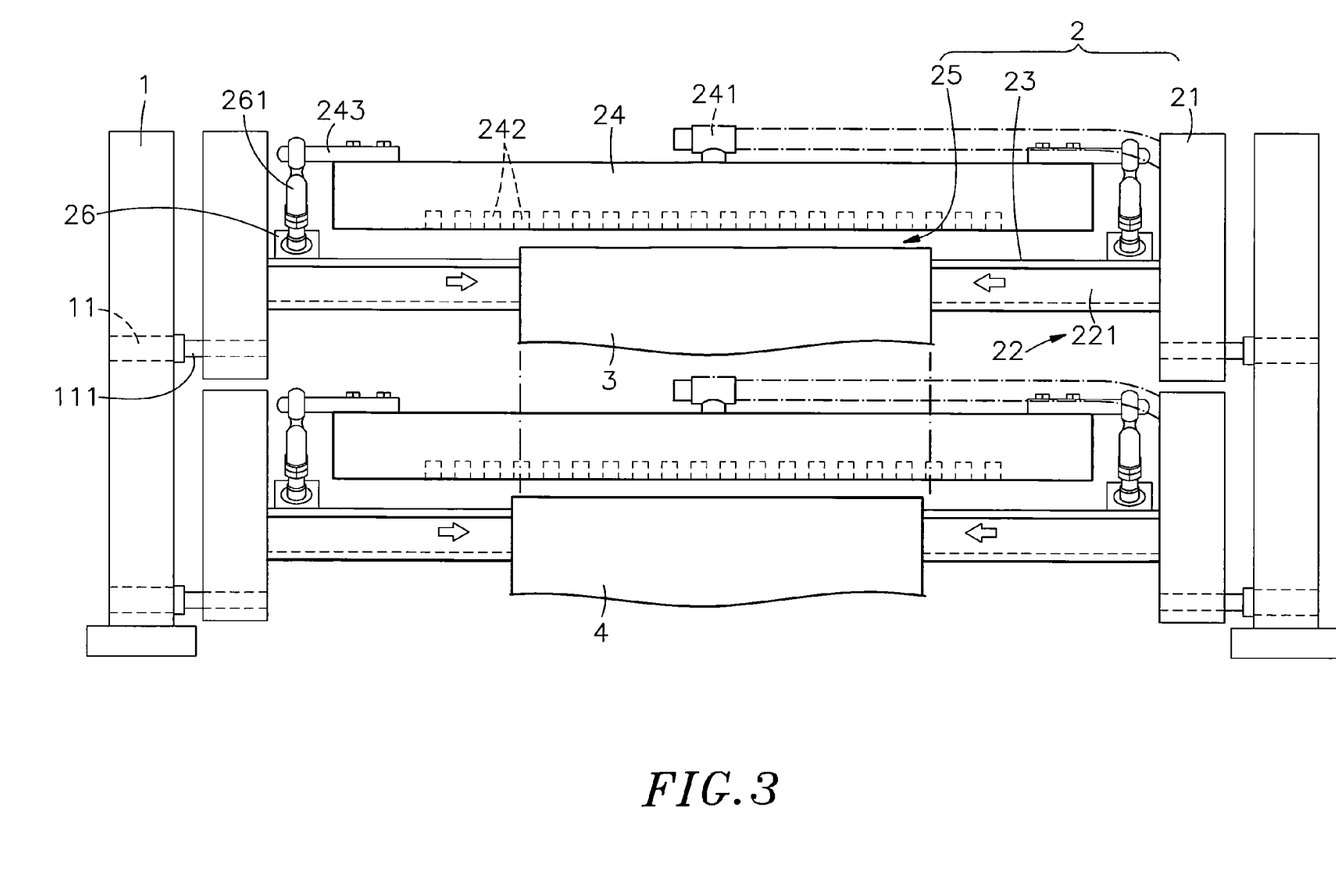
FIG. 3 is a schematic drawing of the present invention showing two sheet members fed into the edge alignment control apparatus before alignment adjustment.
Figure 4:
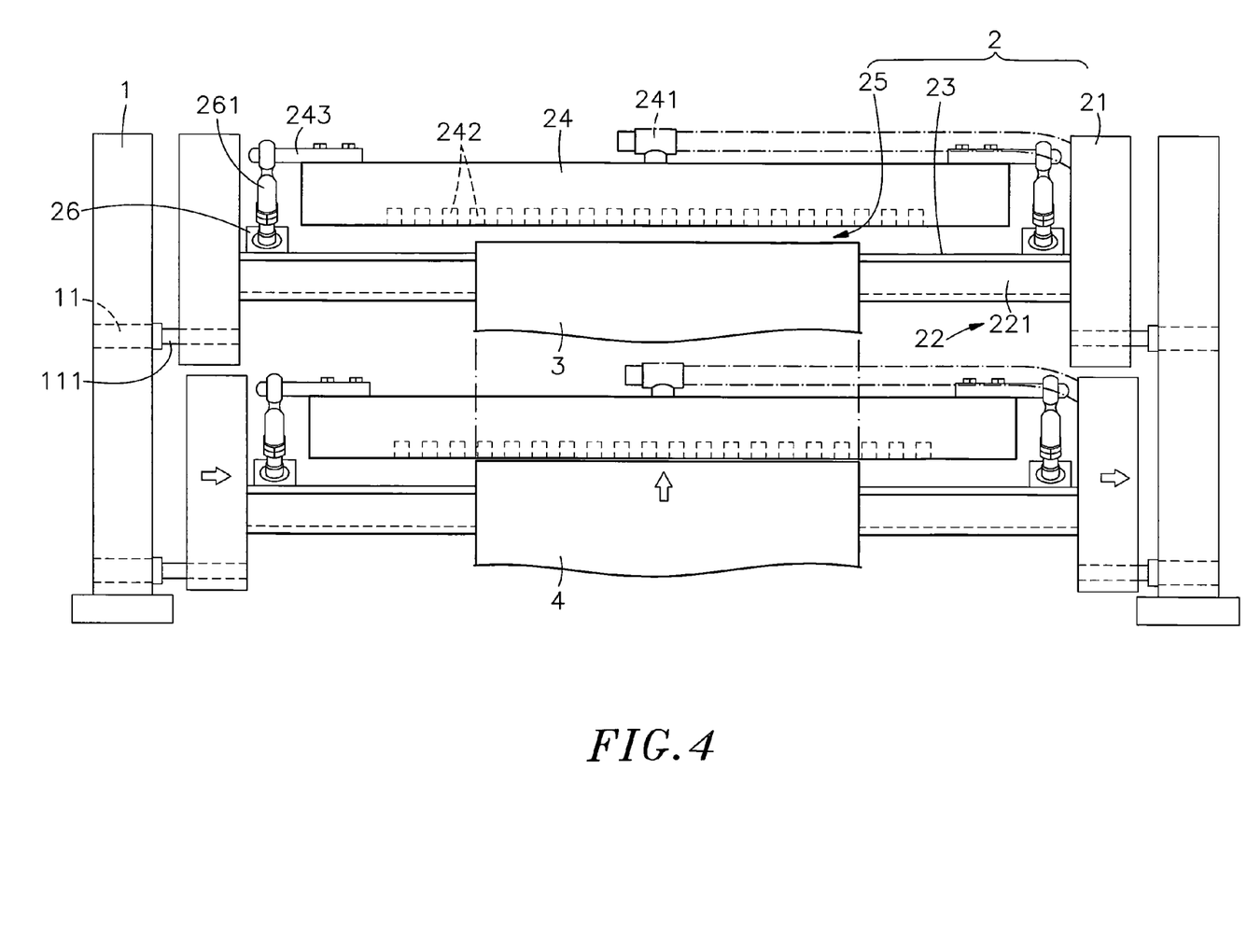
FIG. 4 corresponds to FIG. 3, showing the adjustment units adjusted and the sheet members in perfect alignment.
Figure 5:
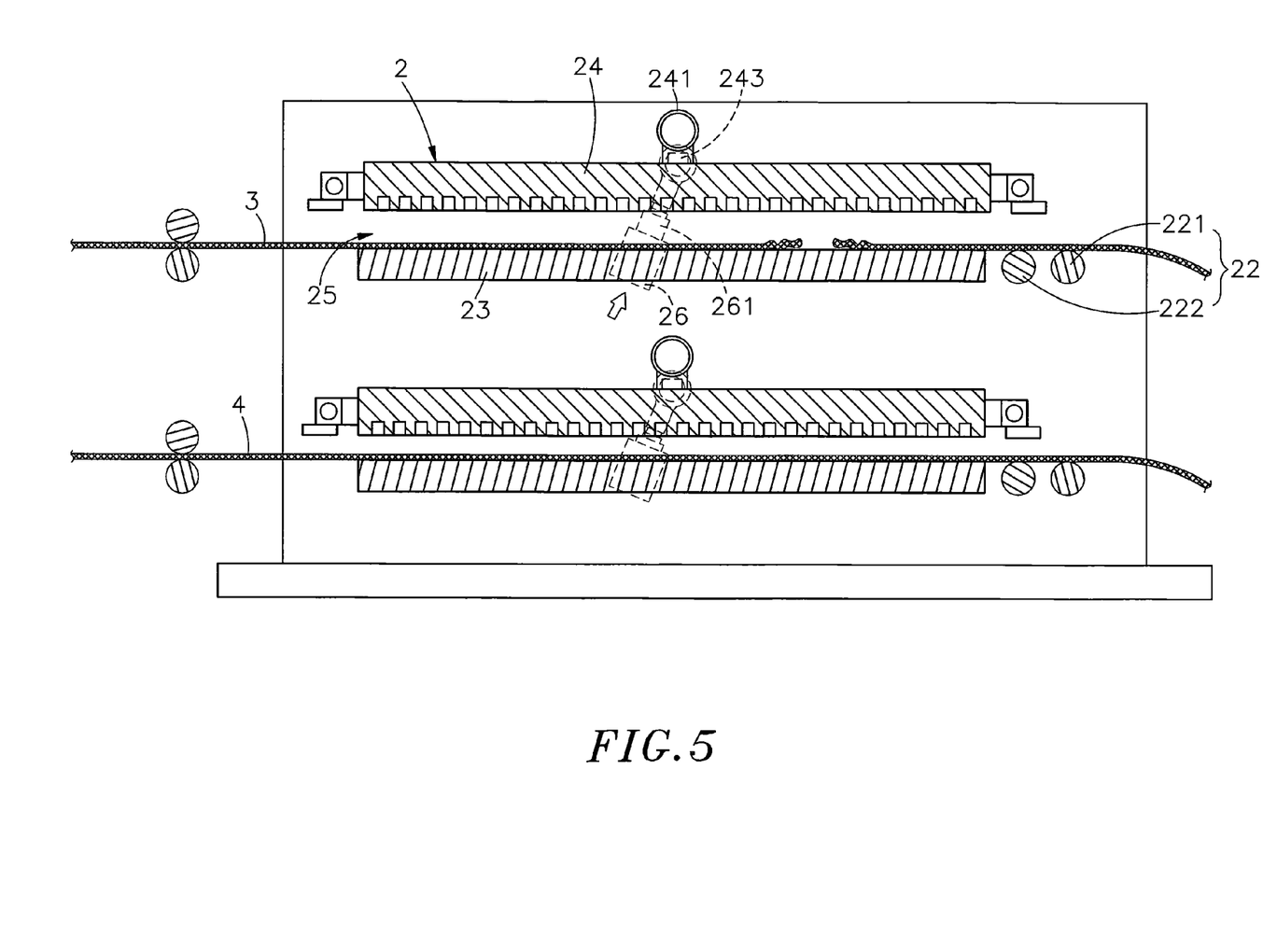
FIG. 5 is a schematic sectional side view of the present invention, showing the suction hood of the upper-sided adjustment unit lifted relative to the respective bearing board.

Referring to FIGS. 3~5 and FIGS. 1 and 2 again, during operation of the edge alignment control apparatus, a first sheet member 3 is delivered by the first roller 221 and second roller 222 of the conveying mechanism 22 of the upper-sided one of the adjustment units 2 into the passage 25 between the associating bearing board 23 and the associating suction hood 24, and a second sheet member 4 is delivered by the first roller 221 and second roller 222 of the conveying mechanism 22 of the lower-sided one of the adjustment units 2 into the passage 25 between the associating bearing board 23 and the associating suction hood 24.

The aforesaid first sheet member 3 and second sheet member 4 are to be glued together. If the first sheet member 3 and the second sheet member 4 are not kept in perfect alignment during gluing, the glued product will become defective. Sensor means (not shown) is applied to detect the position of the first sheet member 3 and the position of the second sheet member 4. If one sheet member, for example, the first sheet member 3 is deviated from the position, a suction pump (not shown) is operated to draw air from the passage 25 of the respective adjustment unit 2 into the suction holes 242 of the respective suction hood 24 toward the respective air pipe 241, thereby sucking up the first sheet member 3. Thereafter, operate the respective first power drives 11 to extend out or retract the respective horizontal reciprocating member 111, thereby moving the holder blocks 21 of the respective adjustment unit 2 leftwards or rightwards to the desired position. Because the first sheet member 3 is secured to the suction hook 24 by an air suction force, adjusting the horizontal position of the adjustment unit 2 causes adjustment of the horizontal position of the first sheet member 3. Adjustment of the horizontal position of the second sheet member 4 can be done in the same manner. Thus, the first sheet member 3 and the second sheet member 4 can be adjusted into perfect alignment conveniently.

In the embodiment shown in FIGS. 1~5, the edge alignment control apparatus comprises two base units 1 and two adjustment units 2 arranged at different elevations between the two base units 1. This embodiment is adapted for delivering two sheet members for gluing into a 2 ply paper board. The number of the adjustment units 2 between the two base units 1 may be relatively changed for application to produce 3, 5, 7 or 10 ply corrugated paper boards.

Referring to FIGS. 1~5 again, during corrugated paper board production, the first sheet member 3 or second sheet member 4 may be damaged. If one sheet member, for example, the first sheet member 3 has a damaged part that protrudes upwards, the damaged part may be jammed in the passage 25, causing interruption of delivery of the first sheet member 3. In this case, operate the second power drives 26 of the respective adjustment unit 2 to extend out the respective reciprocating members 261 vertically and to further lift the connectors 243 and the respective suction hood 24, thereby increasing the vertical height of the passage 25. Thus, the operator can move the first sheet member 3 from the passage 25 and cut off or trim the damaged part. After troubleshooting, the first sheet member 3 can be fed into the production line again. Further, the air pipe 241 of the suction hood 24 of each adjustment unit 2 is a flexible pipe so that adjusting the elevation of the suction hood 24 does not cause the air pipe 241 to break. In case the second sheet member 4 is jammed in the passage 25 of the respective adjustment unit 2 during its delivery, this problem of paper jam can be eliminated in the same manner within a short time. Further, in the aforesaid embodiment, the second power drives 26 are controlled to extend out or retract the respective reciprocating members 261 in vertical. Alternatively, the second power drives 26 can be arranged to reciprocate the reciprocating members 261 obliquely, moving the respective suction hood 24 upwardly upwards or downwards.

Figure 6:
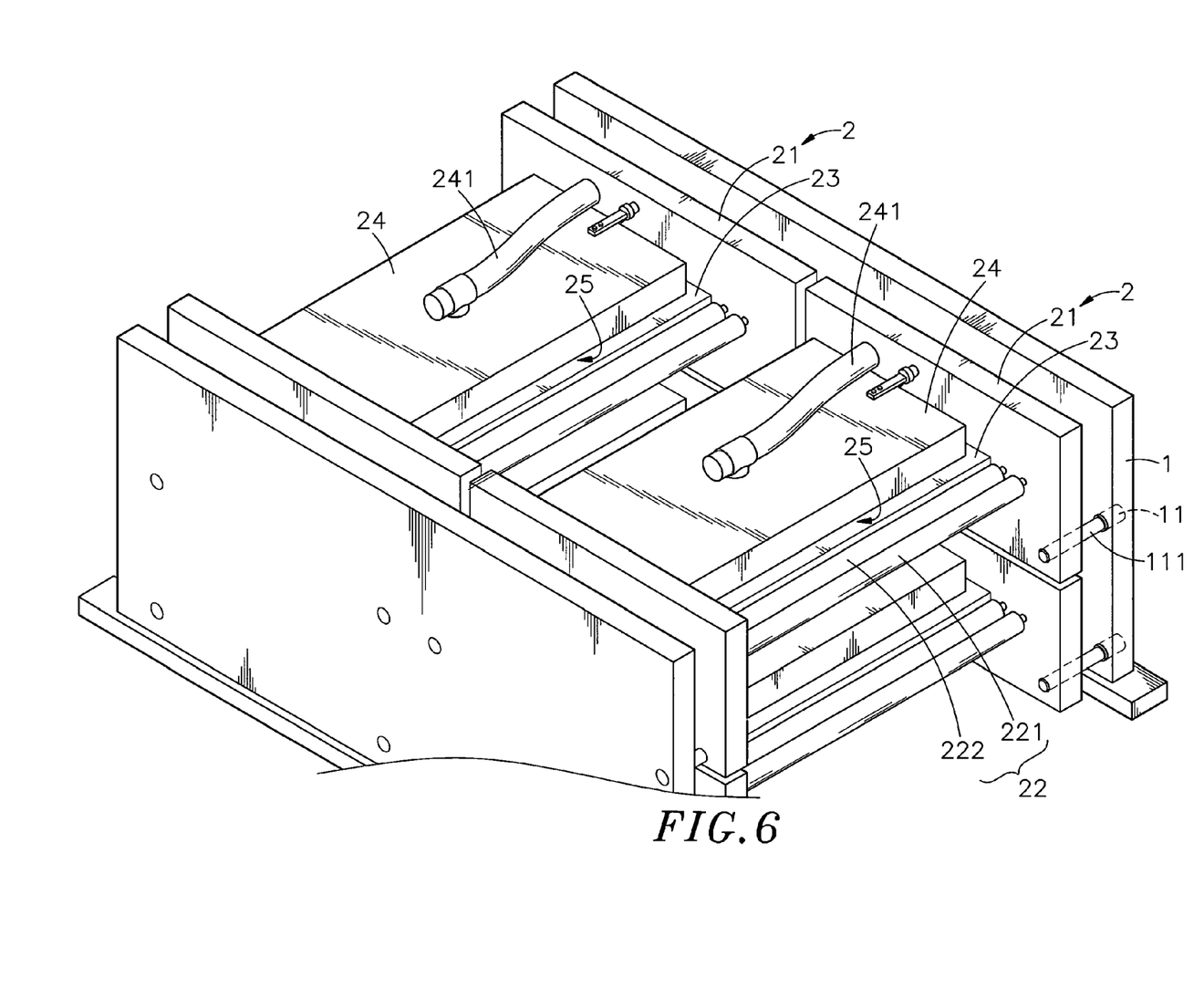
FIG. 6 is a perspective view of a part of an alternate form of the edge alignment control apparatus for sheet material in accordance with the present invention.
Figure 7:
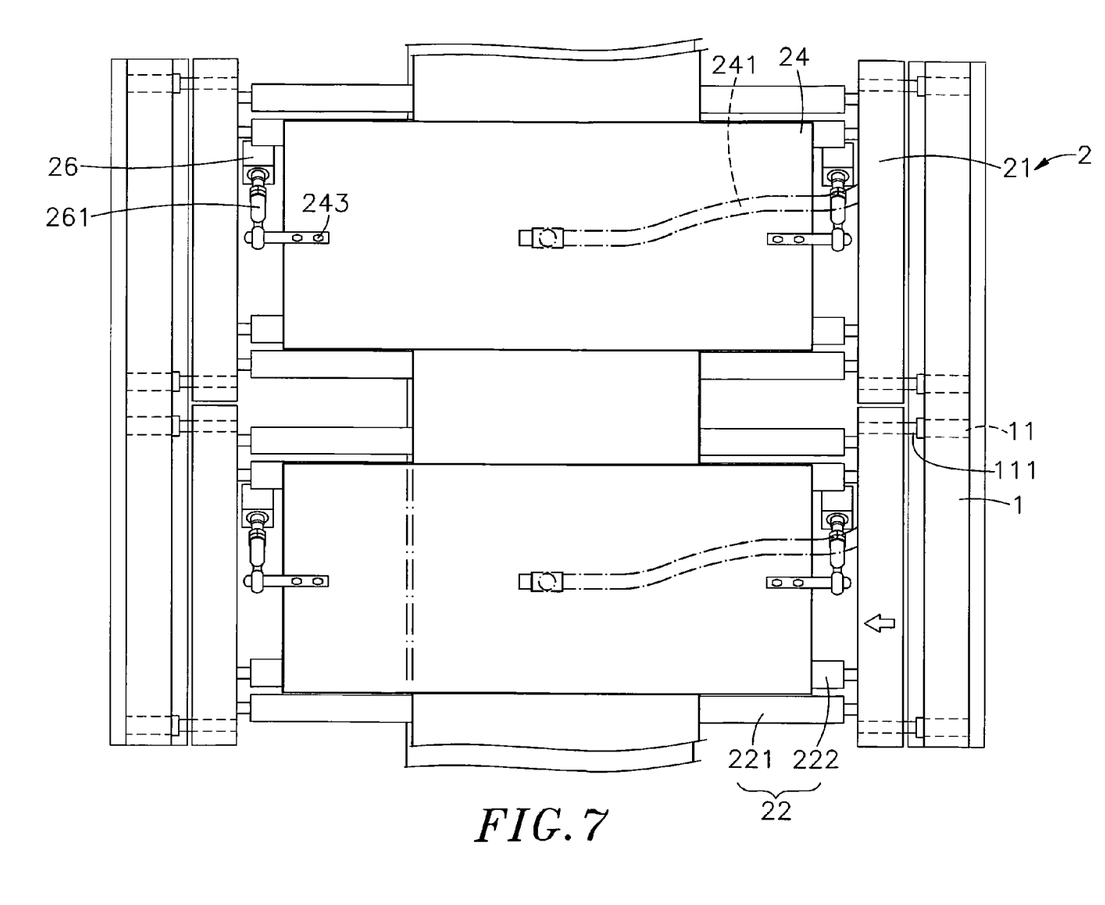
FIG. 7 is a schematic top view of the edge alignment control apparatus shown in FIG. 6, showing the front-sided adjustment unit adjusted.
Figure 8:
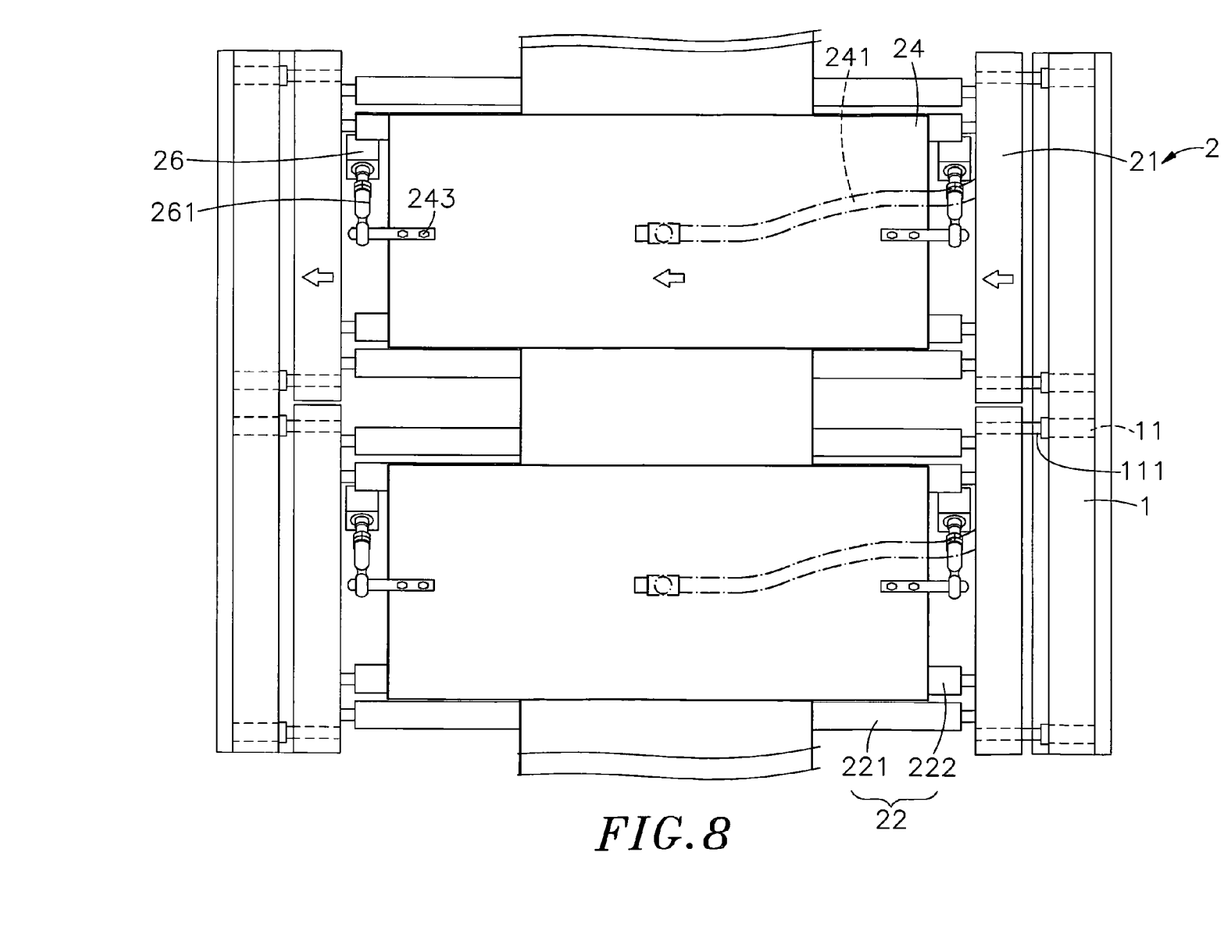
FIG. 8 corresponds to FIG. 7, showing the rear-sided adjustment unit adjusted.

FIGS. 6~8 show an alternate form of the edge alignment control apparatus for sheet material according to the present invention. According to this embodiment, four adjustment units 2 are arranged in two pairs at two different elevations between the two base units 1. The adjustment units 2 can simply be adjusted horizontally within a limited range (for example, 2 mm or 3 mm). If the first sheet member 3 or second sheet member 4 is deviated from the course over the adjustment range of one adjustment unit 2 (for example, 4 mm or 6 mm from the course), the operator can operate the front-sided adjustment unit 2 to adjust the position of the first sheet member 3 or second sheet member 4, and then operate the rear-sided adjustment unit 2 to adjust the position of the first sheet member 3 or second sheet member 4 further. Thus, the adjustment range is doubled.

In conclusion, the invention provides an edge alignment control apparatus for sheet material, which has the following advantages and features:

1. When the suction hood 24 of one adjustment unit 2 is operated to suck up the first sheet member 3 or second sheet member 4, the corresponding first power drives 11 can be operated to extend out or retract the respective horizontal reciprocating members 111, thereby moving the holder blocks 21 of the respective adjustment unit 2 leftwards or rightwards to adjust the first sheet member 3 or second sheet member 4 into perfect alignment with the second sheet member 4 or first sheet member 3 for accurate gluing.
2. If the first sheet member 3 or second sheet member 4 is jammed in the passage 25 between the bearing board 23 and the suction hood 24, the corresponding second power drives 26 can be operated to extend out the respective reciprocating members 261 in lifting the suction hood 25 so that the paper jam problem can be eliminated quickly.
3. Multiple adjustment units 2 can be arranged at front and rear sides at two different elevations between the two base units 1 such that the front-sided adjustment units and the rear-sided adjustment units can be separately adjusted, doubling the adjustment range.

A prototype of edge alignment control apparatus for sheet material has been constructed with the features of FIGS. 1~8. The edge alignment control apparatus for sheet material functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:
1. An edge alignment control apparatus for correcting vertical alignment of sheet members, comprising: two base units arranged in parallel at two opposite lateral sides, each said base unit comprising a plurality of first power drives controllable to reciprocate a respective horizontal reciprocating member; and a plurality of adjustment units arranged between said two base units, each said adjustment unit comprising two holder blocks respectively connected to the horizontal reciprocating members of said base units at one same elevation and movable by the respective horizontal reciprocating members horizontally, a conveying mechanism, said conveying mechanism comprising a first roller pivotally connected between said two holder blocks, a bearing board connected between said two holder blocks at one side relative to said first roller, a suction hood suspending above said bearing board and controllable to suck up a sheet member from said bearing board, and a passage defined between said bearing board and said suction hood for the passing of a sheet member.

2. The edge alignment control apparatus as claimed in claim 1, wherein said conveying mechanism further comprises a second roller pivotally connected between said two holder blocks and arranged between said first roller and said bearing board.

3. The edge alignment control apparatus as claimed in claim 1, wherein said suction hood comprises a plurality of suction holes arranged at a bottom side thereof and facing said bearing board and an air pipe disposed at a top side thereof in air communication with said suction holes.

4. The edge alignment control apparatus as claimed in claim 1, wherein each said adjustment unit further comprises two connectors located on two opposite lateral sides of the suction hood thereof, two second power drives respectively mounted on the holder blocks thereof, and two reciprocating members respectively connected to said connectors and movable by said second power drives to adjust the elevation of the suction hood of the respective adjustment unit relative to the bearing board of the respective adjustment unit.

5. The edge alignment control apparatus as claimed in claim 1, wherein said adjustment units are arranged in an array between said two base units.

* * * * *